United States Patent
Eisenberg

[15] 3,660,162
[45] May 2, 1972

[54] GALVANIC CELL
[72] Inventor: Morris Eisenberg, Palo Alto, Calif.
[73] Assignee: Electrochemica Corporation, Menlo Park, Calif.
[22] Filed: Mar. 27, 1970
[21] Appl. No.: 23,463

[52] U.S. Cl. .........................................136/83 R, 136/100 R
[51] Int. Cl. ......................................................H01m 17/00
[58] Field of Search ..........................136/100, 83, 153–155, 136/57, 65, 3, 6, 120, 20

[56] References Cited

UNITED STATES PATENTS

| 3,468,716 | 9/1969 | Eisenberg | 136/100 |
| 2,739,997 | 3/1956 | Carrick et al. | 136/57 |
| 3,093,514 | 6/1963 | McCallum et al. | 136/100 |
| 3,279,952 | 10/1966 | Minnick | 136/100 |
| 3,380,855 | 4/1968 | Mahy et al. | 136/100 |
| 3,508,967 | 4/1970 | Lyall et al. | 136/20 |

*Primary Examiner*—Anthony Skapars
*Attorney*—Robert B. Kennedy

[57] ABSTRACT

A galvanic cell is disclosed comprising spaced cathodic and anodic electrodes and an electrolyte having an organic aprotic solvent and a soluble solute such as a Lewis acid. At least one of the electrodes has a conductive support member comprising a metal selected from the group consisting of aluminum, magnesium and beryllium.

25 Claims, No Drawings

3,660,162

GALVANIC CELL

BACKGROUND OF THE INVENTION

This invention relates generally to galvanic cells, and particularly to materials and combinations thereof used in galvanic cells of the type which employ organic electrolytes.

As is well-known in the battery art, the active electrode materials which undergo electrochemical reactions during battery operation must normally be mechanically supported by a structure composed of relatively inactive materials. These electrode support members, or grids as they are frequently termed, vary widely in shape and configuration. For example, they may be simply a piece of screen of a suitable mesh size, a piece of expanded metal, or a plate cast with pockets, holes or indentations.

In addition to providing mechanical support the electrode support members also provide electronic conduction between the active electrode materials of each cell and externally accessible terminals to which an external circuit may be connected. This electronic conductance is required for the supply and removal of electrons from the electrodes when half-cell electrochemical reactions occur at each electrode during battery operation. Thus, the electrode support members normally comprise metals or metal alloys. But, as indicated above, the support member itself must not participate appreciably in the electrochemical half-cell reaction, nor must it corrode nor react with and thereby contaminate the cell electrolyte. In other words, the electrode supports must remain essentially passive.

Heretofore, the electrode support members in conventional batteries have almost invariably been composed of lead alloys, silver, silver plated copper, nickel or nickel plated steel insomuch as only these have been found to meet the above-recited mechanical and electrochemical requirements on a practical, commercial basis. Though these materials do provide operative electrode support members they simultaneously exhibit several undesirable traits, the foremost of which being their weight. The generally acid or strongly alkaline nature of conventional aqueous electrolytes has precluded the use of other lighter metals as electrode support materials.

Accordingly, it is an object of the present invention to provide an improved galvanic cell.

More particularly, it is an object of the present invention to provide a relatively light weight galvanic cell.

Another object of the invention is to provide a galvanic cell having electrode support members which provide sound mechanical support and electronic conduction, exhibit a relatively low rate of reaction with electrolytes of the organic type, and yet which are lightweight, malleable, rollable and relatively inexpensive.

SUMMARY OF THE INVENTION

Briefly described, the present invention is a galvanic cell comprising spaced cathodic and anodic electrodes and an electrolyte having an organic aprotic solvent and a soluble solute to provide electrolytic conduction between said spaced electrodes. At least one of said electrodes has a conductive support member which comprises a metal selected from the group consisting of aluminum, magnesium and beryllium.

DESCRIPTION OF THE PREFERRED EMBODIMENTS

In aqueous electrolyte batteries, that is those in which water is the solvent, appreciable electrode reaction rate capabilities and specific conductivities are usually achieved by employing acids, such as sulfuric acid solutions, or alkalis, such as sodium hydroxide or potassium hydroxide, or generally strongly ionic and thus corrosive salts as solutes in water. Only certain relatively high specific gravity conductive materials have been found capable of providing mechanical support for the active electrode materials while remaining passive to the strong acid, salt and alkaline solutions. Thus, where sulfuric acid is used as solute, lead alloys are usually used in forming the electrode support members. In alkaline solutions nickel, nickel plated steel, silver plated copper and even pure silver are so used. However, according to the principles of the present invention a relatively lightweight galvanic cell is constructed by using aluminum, magnesium or beryllium, either in their relatively pure metallic form, in combinations with each other, or as alloys, as electrode supports, and an electrolyte comprising organic aprotic solvents. Such cells have been found to perform well where such support materials support lithium and calcium anodes as well as cathodes comprising metal chlorides, sulfides, fluorides and bromides. Examples of such anodes are those in which the active material comprises calcium, strontium and barium and the alkali metals of group Ia of the periodic system of elements. Examples of such cathodes are those in which the active material comprises copper chloride, copper bromide, copper fluoride, copper sulfide, silver fluoride, silver difluoride, silver chloride, silver bromide and the halide compounds of nickel, cobalt and manganese.

The organic aprotic electrolytes comprise a solute which may be a Lewis acid, preferably with a coordinating salt, or any other kind of a salt sufficiently soluble in the organic aprotic solvent to yield an electrolyte with a specific conductivity of at least $5 \times 10^{-4}$ mhos/cm and yet not participate appreciably in the electrode reactions of the cell. Examples of Lewis acids are aluminum fluoride, aluminum chloride, aluminum bromide, boron halides such as boron chloride, boron fluoride and boron bromide antimony fluorides and antimony chlorides. Examples of such other kinds of salts are lithium perchlorate, sodium perchlorate and magnesium perchlorate.

The Lewis acids, or salts are dissolved in aprotic solvents. The Lewis acids may be dissolved either with or without alkali metal halide or earth alkali coordinating compounds such as lithium fluoride, lithium chloride, lithium bromide, sodium chloride or sodium fluoride. Examples of the aprotic solvents successfully used include pentacyclic esters, aliphatic ethers, cyclic ethers, nitroparaffins, cyclic ketones, aliphatic nitriles, chlorinated esters, cyclic and aliphatic amines and amides. Where desired, compatible combinations of the just listed aprotic solvents may be used such as those described in U. S. Pat. No. 3,468,716. Thus, the particular solvent and solute is largely a matter of choice so long as their combination produces an electrolyte that is aprotic in nature and has sufficient specific conductivity.

The just disclosed electrode support members are not, of course, completely free from corrosive attack by some organic electrolytes. Those combinations of support materials and electrolytes in which corrosion occurs more rapidly have nevertheless been found quite suitable for use in reserve type batteries, that is primary batteries in which the electrolyte is introduced just prior to battery operation which operative period does not ordinarily exceed 1 week. A $20 \times 20$ mesh (0.010-inch thick wire) aluminum screen type 1100 in an aluminum chloride solution in nitromethane-propylene carbonate solvent mixtures will corrode at a rate rendering its use limited to such a reserve type battery where there is an insufficient amount of coordinating salts, such as lithium chloride, in the electrolyte. In general the closer the proportionality between the Lewis acid and coordinating salt to a ratio of 1:1 by weight, the lesser the rate of support corrosion. Thus, one part by weight of aluminum chloride, a Lewis acid, to one part by weight of lithium chloride, a coordinating salt, provides for minimal corrosion. For more acidic electrolytes, that is those containing a relatively low proportion of coordinating salt, the life of the support can be substantially extended, where desired, by electroplating it with nickel. The proportion of Lewis acid to coordinating salt by weight should be 1:1.5 and 4.1.

The following three specific examples of material combinations and compositions have been found to produce galvanic cells having a highly satisfactory life period for many practical applications:

EXAMPLE I

A 20 × 20 mesh aluminum screen alloy, No. 1100, which is commercially pure aluminum with a minimum content of 99 percent aluminum, to which an aluminum contact tab has been welded on, is used to make a lithium anode by pressing on in an inert atmosphere of argon, a piece of lithium metal. A similar piece of aluminum screen is used as a support grid for the cathode in which a mixture of copper chloride with small additions of graphite as a conducting additive and a suitable binder is pressed to yield a cathode. Using six such cathodes and seven anodes interleaved with a nonwoven polypropylene separator a cell is assembled with an electrolyte comprising by volume 80 percent nitromethane, 20 percent propylene carbonate containing 3 moles/liter of aluminum chloride and 0.3 moles/liter of lithium chloride. The open circuit voltage of this cell, the construction of which is described more fully in U. S. Pat. No. 3,468,716, was found to be 3.10 volts at an ambient temperature of 20° C. Two cells thus constructed have been discharged at the same time with two control cells in which the grids were screens of the same mesh, i.e., 20 × 20 mesh, and wire thickness, but made of nickel. As can be seen from Table 1, in which the comparison is given, the aluminum equipped cell yields about the same amount of power, but because of a lighter weight results in a substantial increase of energy density as expressed in watt-hours per pound.

EXAMPLE II

Two cells are built using aluminum type 1100 grids of the same mesh as in the preceding example, but electroplated with nickel. These cells are also discharged at 12 amps and in the same electrolyte as Example I, yielding comparable cell voltages and capacities as the other cells. However, due to the lower weight they were capable of significantly larger energy densities as illustrated in the fourth column of Table 1.

EXAMPLE III

Cells are constructed using perforated sheet of magnesium alloy type AZ31B (96% magnesium, 3% aluminum, 1%zinc), a commercial alloy with a specific gravity of 1.77. Cells are constructed using these perforated magnesium sheets as supports and filled with the same electrolyte as given in Example I. The energy density yield obtained is 15—18% greater than those of the aluminum cells of Table 1.

TABLE 1.—ENERGY DENSITY YIELDS OF ORGANIC ELECTROLYTE CELLS WITH NICKEL AND WITH ALUMINUM SUPPORT GRIDS

5 A-H nominal capacity cells discharged at room temperature at 12 amps

| | Grid type | | |
|---|---|---|---|
| | Nickel | Aluminum type 1100 (Example I) | Aluminum type 1100 plated with nickel (Example II) |
| Cell Weight, No. lb | 0.320-0.322 | 0.240-0.245 | 0.245-0.250 |
| Avg. cell voltage (under load) | 2.17-2.20 | 2.14-2.18 | 2.12-2.17 |
| Percent faradaic efficiency (percent yield of theoretic capacity) | 66-67 | 65-67 | 68-72 |
| A-H deliv. to 1.0 v. cutoff | 5.6-5.7 | 5.5-5.7 | 5.9-6.0 |
| Energy density yield, WH/No. lb | 37.8-39.2 | 49-54 | 50-53.2 |

It should, of course, be understood that just-described examples merely illustrate principles of the invention. The spirit and scope of the invention is intended to be limited only by the following claims.

I claim:

1. A galvanic cell comprising spaced cathodic and anodic electrodes, an electrolyte having an organic aprotic solvent and soluble solute to provide electrolytic conduction between said spaced electrodes, at least one of said electrodes having a conductive support member consisting essentially of at least one metal selected from the group consisting of aluminum, magnesium, beryllium and alloys thereof.

2. A galvanic cell in accordance with claim 1 wherein said conductive support member consists essentially of aluminum.

3. A galvanic cell in accordance with claim 1 wherein said conductive support member consists essentially of magnesium.

4. A galvanic cell in accordance with claim 1 wherein said conductive support member consists essentially of aluminum and magnesium.

5. A galvanic cell in accordance with claim 1 wherein said conductive support member consists essentially of an aluminum alloy comprising at least 20 percent aluminum by weight.

6. A galvanic cell in accordance with claim 1 wherein said conductive support member consists essentially of a magnesium alloy comprising at least 20 percent magnesium by weight.

7. A galvanic cell in accordance with claim 1 wherein said one electrode has an anodic active material supported by said support member, said anodic active material comprising a metal selected from the group consisting of lithium and calcium.

8. A galvanic cell in accordance with claim 1 wherein said one electrode has a cathodic active material supported by said support member.

9. A galvanic cell in accordance with claim 8 wherein said active material is a halide of a metal selected from the group consisting of iron, cobalt, nickel, copper, silver, cadmium, mercury and manganese.

10. A galvanic cell in accordance with claim 9 wherein said cathodic active material comprises silver chloride.

11. A galvanic cell in accordance with claim 9 wherein said cathodic active material comprises copper chloride.

12. A galvanic cell in accordance with claim 8, wherein said cathodic active material comprises a sulfide of a metal selected from the group consisting of iron, cobalt, nickel, copper, silver, cadmium, mercury and manganese.

13. A galvanic cell in accordance with claim 1 wherein said soluble solute comprises a Lewis acid.

14. A galvanic cell in accordance with claim 13 wherein said soluble solute further comprises an alkali metal coordinating salt.

15. A galvanic cell in accordance with claim 13 wherein said soluble solute further comprises an earth alkali coordinating salt.

16. A galvanic cell in accordance with claim 14 wherein the proportions by weight of Lewis acid to alkali metal coordinating salt is between 1:1.5 and 4:1.

17. A galvanic cell in accordance with claim 15 wherein the proportions by weight of Lewis acid to earth alkali coordinating salt is between 1:1.5 and 4:1.

18. A galvanic cell in accordance with claim 1 wherein said electrolyte has a specific conductivity of at least $5 \times 10^{-4}$ mhos/cm.

19. A galvanic cell comprising spaced cathodic and anodic electrodes, an electrolyte having an organic aprotic solvent and soluble solute to provide electrolytic conduction between said spaced electrodes, at least one of said electrodes having a conductive support member consisting essentially of a first metal selected from the group consisting of aluminum, magnesium and beryllium and a second metal selected from the group consisting of nickel, silver and copper, said first metal being plated with said second metal.

20. A galvanic cell in accordance with claim 19 wherein said one electrode has an anodic active material supported on said support member, said anodic active material comprising a metal selected from the group consisting of lithium and calcium.

21. A galvanic cell in accordance with claim 19 wherein said one electrode has a cathodic active material supported by said support member.

22. A galvanic cell comprising spaced cathodic and anodic electrodes, an electrolyte having an organic aprotic solvent and soluble solute to provide electrolytic conduction between said spaced electrodes, at least one of said electrodes having a conductive support member at least the surface of which support member consisting essentially of metal selected from the group consisting of aluminum, magnesium and beryllium.

23. A galvanic cell in accordance with claim 22 wherein said electrolyte has a specific conductivity of at least $5 \times 10^{-4}$ mhos/cm.

24. A galvanic cell in accordance with claim 22 wherein said soluble solute comprises a Lewis acid and an alkali metal coordinating salt, and wherein the proportions by weight of Lewis acid to alkali metal coordinating salt is between 1:1.5 and 4:1.

25. A galvanic cell in accordance with claim 22 wherein said soluble solute comprises a Lewis acid and an earth alkali coordinating salt, and wherein the proportions by weight of Lewis acid to alkali metal coordinating salt is between 1:1.5 and 4:1.

* * * * *